Dec. 26, 1933.    R. D. WEYERBACHER    1,940,830
FORM FOR MAKING AIRCRAFT FUSELAGES
Original Filed Oct. 3, 1931    2 Sheets-Sheet 1
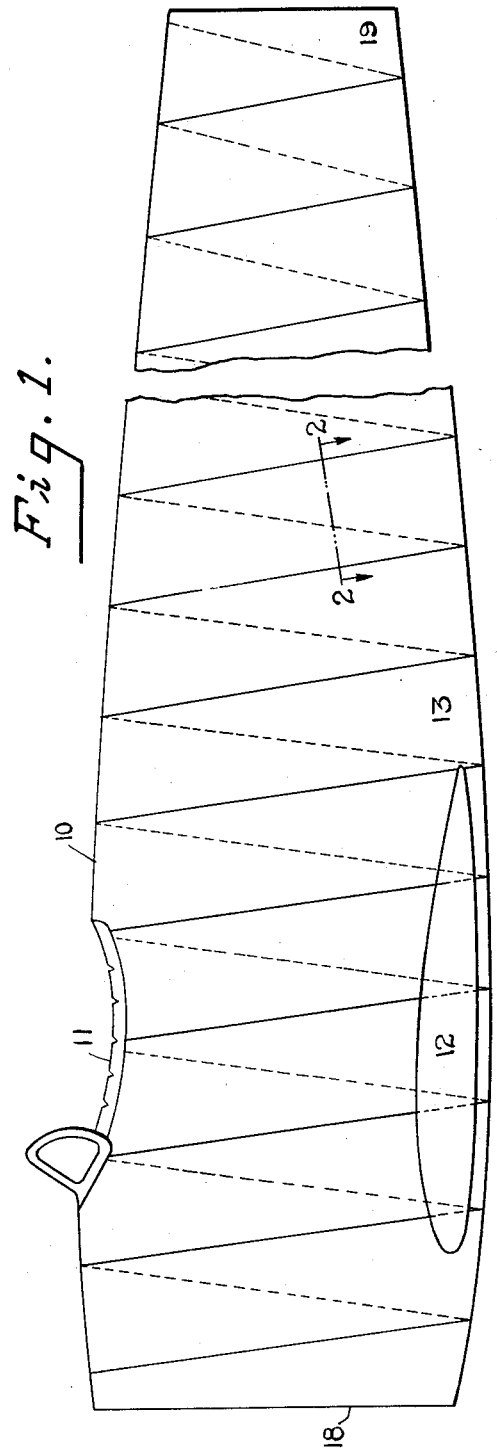
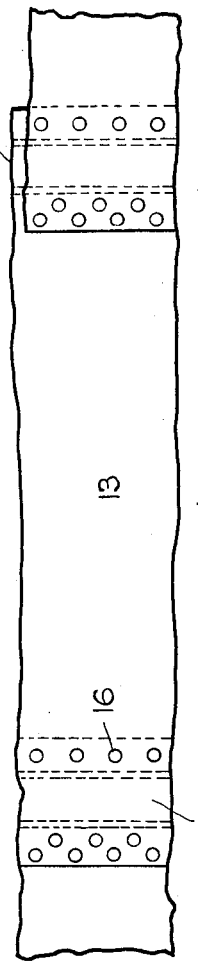
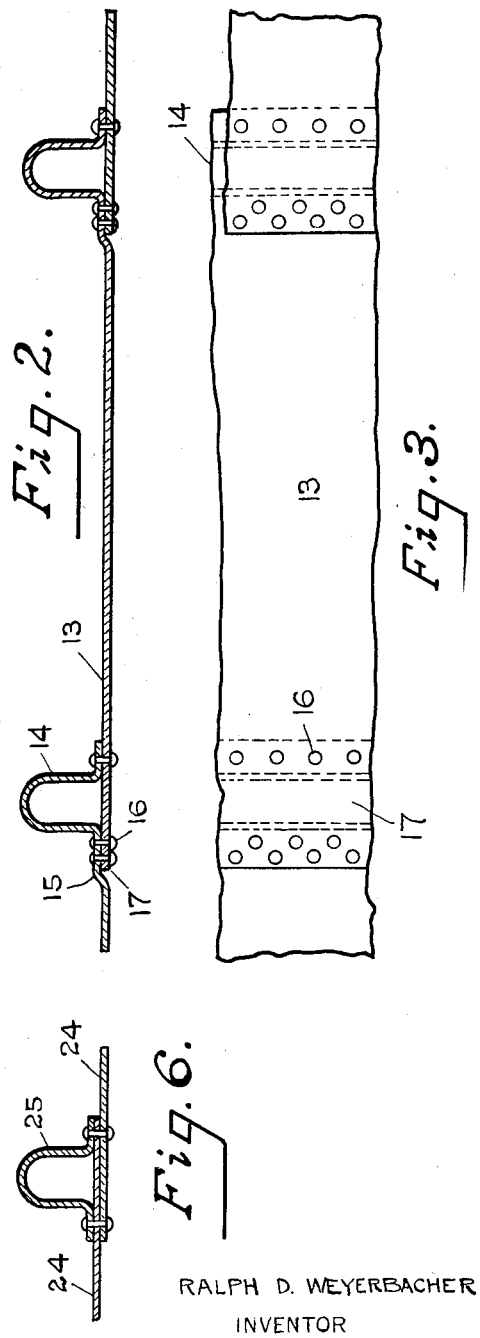
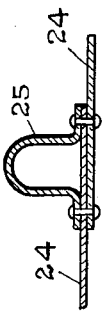
RALPH D. WEYERBACHER
INVENTOR
BY
*Robert A. Lavender*
ATTORNEY Dec. 26, 1933.   R. D. WEYERBACHER   1,940,830
FORM FOR MAKING AIRCRAFT FUSELAGES
Original Filed Oct. 3, 1931    2 Sheets-Sheet 2
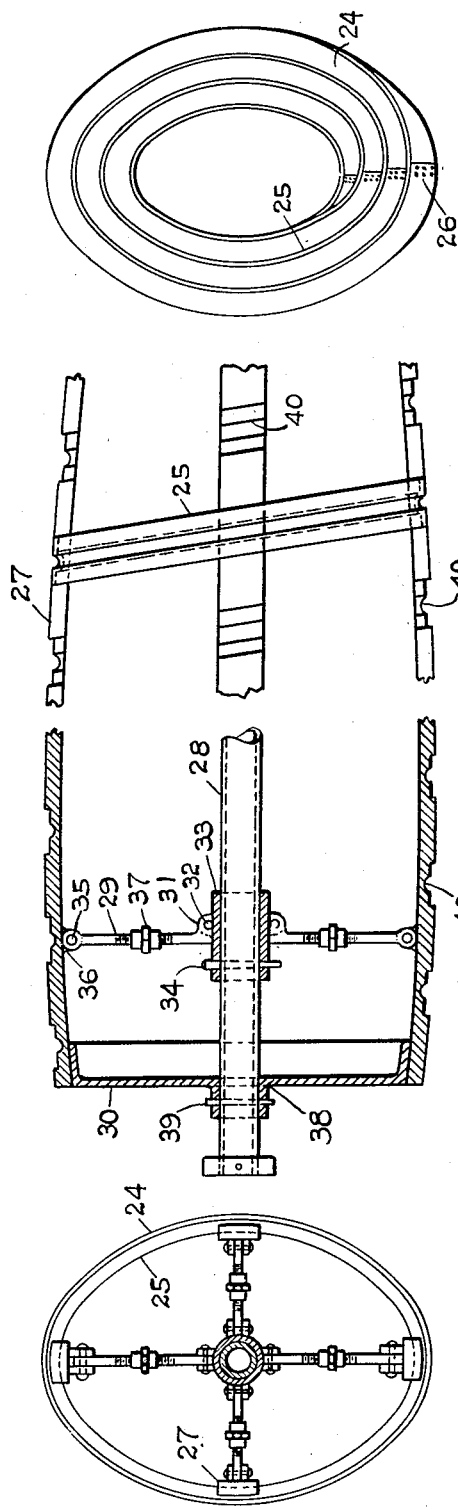
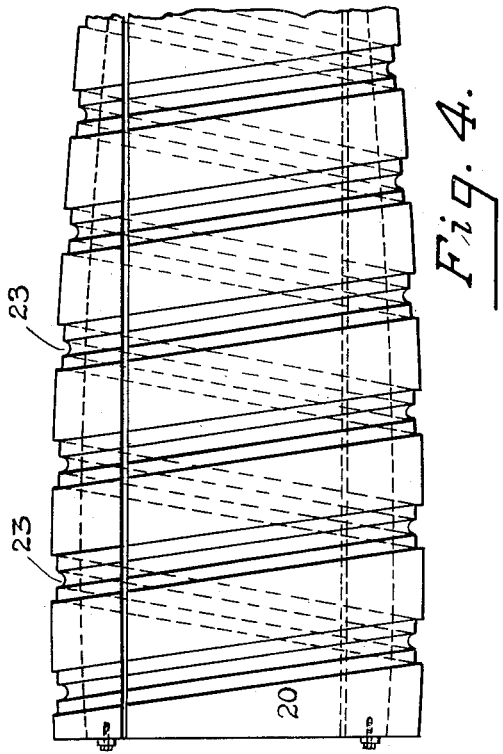
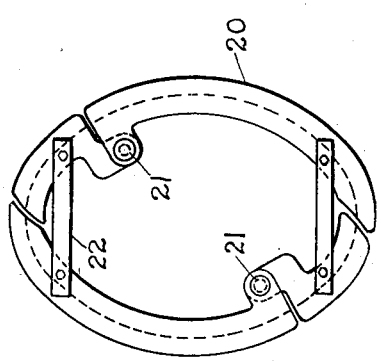
RALPH D. WEYERBACHER
INVENTOR
BY
*Robert A. Lavender*
ATTORNEY Patented Dec. 26, 1933

1,940,830

UNITED STATES PATENT OFFICE 1,940,830

FORM FOR MAKING AIRCRAFT FUSELAGES

Ralph D. Weyerbacher, United States Navy

Original application October 3, 1931, Serial No. 566,691. Divided and this application November 28, 1932. Serial No. 644,644

2 Claims. (Cl. 153—64)

(Granted under the act of March 3, 1883, as amended April 30, 1928; 370 O. G. 757)

My invention relates broadly to an airplane construction and more particularly to the building of a spiral wound fuselage for an aircraft.

The present application is a division of my co-pending application Serial No. 566,691 filed October 3, 1931.

The primary object of my invention is to fabricate a spiral wound fuselage for an aircraft from a sheet of metal without utilizing the conventional type of longeron and strut members.

Another object of my invention is to provide in a sheet of metal making up a spiral wound fuselage, an integral bead or stiffener at the places where the sheet metal overlaps in forming the spiral, and a suitable means for constructing the same.

A further object of my invention is to provide in the construction of a spiral wound fuselage of an airplane, a spiral stiffener or bead member for supplying longitudinal and transverse strength to the entire structure.

Another object of my invention is to provide a device to construct an airplane fuselage of helical plate sections secured to a spiral wound reinforcing member at the point where two of the sections are joined together.

It is also an object of my invention to fabricate a fuselage that is rugged, of light weight and well reinforced without the use of longeron and strut members.

With the above and other objects in view, the invention consists in the construction, combination and arrangement of parts as will be described more fully hereinafter.

Reference is to be had to the accompanying drawings forming a part of this specification, in which like reference characters indicate corresponding parts throughout the several views, and in which:

Fig. 1 is a side elevation of my improved fuselage;

Fig. 2 is a section taken on line 2—2 of Fig. 1;

Fig. 3 is a detail section of my improved fuselage;

Fig. 4 is a side elevation showing a part of a jig for constructing my improved fuselage;

Fig. 5 is an end view of Fig. 4;

Fig. 6 is a detail section of a modified form of my improved fuselage;

Fig. 7 is a side elevation, partly in section, of a jig for constructing the modified form of my improved fuselage;

Fig. 8 is an end view of Fig. 7;

Fig. 9 is an inside view of a portion of the modified form of my improved fuselage.

Referring more particularly to the drawings, 10 indicates a fuselage of an airplane having cockpit 11 therein and conventional wing 12 secured thereto. The fuselage 10 is constructed by spirally winding a long, relatively narrow sheet of metal 13, preferably duralumin with slightly overlapping turns to produce a tapering structure of decreasing elliptical section. A stiffener or reinforcing bead 14 is integrally pressed, shaped, or formed in an offset side 15 of the sheet 13 so that when the successive turns of the spiral are riveted together by rivets 16 along the overlap 17, the bead 14 extends inward and forms a part of the joint while the offset side 15 permits a continuous surface. The forward end of the spirally wound sheet is sheared off to form a vertical front edge 18 to which the engine cowl, not shown, is secured. Riveted to the rear end of the fulelage 10 is a tail section 19 which is cut on an angle to conform to the spiral of the metal sheet 13. I desire it to be understood that the bead 14 may be an independent member with the spirally wound sheet of metal secured to it.

In building up my spirally wound fuselage, I utilize a collapsible jig or form, as shown in Figs. 4 and 5, that has the shape of the finished product. This form is made up of a number of longitudinal units 20, either of wood or metal, movably secured together by means of hinges 21 and straps 22. Cut into the outer surface of the units 20 is a continuous spiral groove 23 adapted to receive and hold in place the bead 14 while the sheet of metal 13 is being wound around the form.

In fabricating the fuselage 10, the bead 14 and offset side 15 are first pressed or formed into the sheet 13. The sheet is then spirally wound into shape around the jig with bead 14 extending into groove 23. After this operation, the jig is removed and the sheet in the spiral shape is made secure by riveting along the overlapped portions thereof. The resultant body is then vertically sheared at the forward end for the engine cowl and the tail member is riveted to the rear of the body. Openings are suitably cut into the fuselage for the cockpit 11.

Figs. 6, 8 and 9 show a modified form of my improved fuselage wherein helical sections of sheet metal are secured together and attached to an independent stiffener or U reinforcing member 25. In this modification, plates 24 which vary slightly in size and make up one complete section or turn of the fuselage are joined together by placing the rear portion of one of the plates 24 in under the forward portion of the succeeding plate and then riveting the resulting lap joint to the stiffener 25. Each of the plates overlap at the bottom and are riveted as at 26.

To build the modified fuselage, a suitable jig or form as shown in Figs. 7 and 8 is utilized. This form comprises longitudinal units 27, a central spindle 28, arms 29 and a movable bulkhead 30 for holding the units 27 in position. One end of the arms 29 is hinged by means of ears 31 and pins 32 to adjustable collars 33 that are movably mounted around the spindle 28 and can be secured in position by wedge pins 34. The other ends of the arms 29 are pivoted by pins 35 to ears 36 on the under side of units 27 and to vary the position of the units 27, the arms 29 are preferably of two sections joined together by a turnbuckle 37. The bulkhead 30 is movably secured to the spindle 28 by means of a collar 38 and wedge pin 39 passing through the collar and spindle. Grooves 40 for receiving the reinforcing member 25 are suitably spaced and cut into the units 27.

In making up the modified form of fuselage, the jig is first set up and then the member 25 is spirally wound around the jig so as to properly fit into the grooves 40 of the units 27. The plates 24 are next rolled into shape and placed around the form. Each plate as it is placed is riveted to the succeeding plate and to the member 25. After all the plates are secured, including the front plate and the tail plate, the jig is removed and the cockpits are then cut into the top of the completed fuselage.

It will be understood that the above description and accompanying drawings comprehend only the general and preferred embodiment of my invention and that various changes in construction, proportion and arrangement of parts may be made within the scope of this invention and the appended claims, without sacrificing any of the advantages thereof.

The herein described invention may be manufactured and used by or for the Government of the United States for governmental purposes without the payment to me of any royalties thereon or therefor.

What I claim is:

1. In a form for making aircraft fuselages, comprising a central spindle, adjustable arms, means for hinging one end of said arms to the spindle, longitudinal members hinged to the other end of said arms, spiral grooves cut into said members and a bulkhead on said spindle adapted to hold said longitudinal members in an opening position whereby a fuselage can be built around the same.

2. In a form for making aircraft fuselages comprising two longitudinal members, each of said members having hinged sections, strap members on the ends of said longitudinal members adapted to secure the same together to form the shape of a completed fuselage and a continuous spiral groove in said longitudinal members for receiving a portion of the fuselage.

RALPH D. WEYERBACHER.